United States Patent [19]
Masuda

[11] Patent Number: 6,034,559
[45] Date of Patent: Mar. 7, 2000

[54] CLOCK CIRCUIT EMPLOYABLE FOR SEQUENTIAL REGULATION SYSTEMS HAVING MULTIPLE FUNCTIONS

[75] Inventor: Hirohisa Masuda, Tokyo, Japan

[73] Assignee: Oki Electric Industry Co., Ltd., Tokyo, Japan

[21] Appl. No.: 09/038,237

[22] Filed: Mar. 11, 1998

[30] Foreign Application Priority Data

Aug. 27, 1997 [JP] Japan ................................. 9-246178

[51] Int. Cl.[7] .............................. H03K 3/00; G06F 1/04
[52] U.S. Cl. .......................................................... 327/291
[58] Field of Search .................................. 327/105–107, 327/165, 166, 170, 172, 176, 178, 291, 292, 293, 295, 564, 565

[56] References Cited

U.S. PATENT DOCUMENTS

| 5,831,459 | 11/1998 | McDonald | 327/141 |
| 5,892,507 | 4/1999 | Moorby et al. | 345/302 |
| 5,907,256 | 5/1999 | Suzuki | 327/291 |

FOREIGN PATENT DOCUMENTS

| 6-204817 | 7/1994 | Japan . |
| 6-282350 | 10/1994 | Japan . |

*Primary Examiner*—My-Trang Nu Ton
*Attorney, Agent, or Firm*—Jones Volentine, LLP

[57] ABSTRACT

A clock pulse circuit having a construction of multiple stories provided with a terminal for a clock pulse generator, a first story trunk line connected the clock pulse generator, a plurality of first story branch lines, each of which is connected the first story trunk line, a plurality of second story trunk lines each of which is connected one of the second story trunk liens, a plurality of second story branch lines, each of which is connected one of the second story trunk lines, and a plurality of combinations of higher story trunk lines and higher story branch lines, such combinations being composed of in the similar manner as is defined above, wherein a switching element is provided between selected one of the branch lines and the trunk line following the selected one of the branch lines.

18 Claims, 5 Drawing Sheets

CLOCK CIRCUIT EMPLOYABLE FOR SEQUENTIAL REGULATION SYSTEMS HAVING MULTIPLE FUNCTIONS

FIELD OF THE INVENTION

This invention relates to an improvement applicable to a clock circuit employable for a sequential regulation systems having multiple functions. More specifically, this invention relates to an improvement developed for reducing the power consumption consumed by a clock circuit having a construction of multiple stories.

BACKGROUND OF THE INVENTION

A sequential regulation system, a combination of units regulated following sequential commands, such as a counter, a register, a memory, a ratch, a flip-flop circuit et al. each of which works following a clock pulse or clock pulses, requires a clock circuit generating and supplying a series of clock pulses having a regular time interval therebetween. Particularly in a synchronous system, uniformity of clock pulses is important. In other words, each end terminal is required to be given clock pulses simultaneously or precisely on the same time.

Since the circuit constant particularly the resistance of each of the clock pulse transmission circuits is not necessarily uniform, however, it is not easy to make the clock pulse transmission period uniform for all the clock pulse transmission circuits, particularly in the cases where the sequential regulation system is large, and resultantly the sequential regulation system having a number of the destination units each of which requires to the given a clock signal. This problem is more severe for a sequential regulation system having multiple functions. As a result, in such a case as was described above, each clock pulse does not necessarily arrive at each destination unit at the same time. This phenomenon in which each clock pulse arrives at each destination unit with a time difference, is called a clock skew. Developed to avoid occurrence of a clock skew is a clock circuit having a construction of multiple stories in which a clock circuit is composed of a plurality of stories each of which is composed of a combination of a trunk line and plural branch lines, as shown in FIG. 1. Referring to FIG. 1, the first story is composed of a trunk line (1) and 10 branch lines (2), and the second story is composed of a plurality of combinations of a trunk line (1') and five branch lines (2'). Since all the functional units which require a clock pulse simultaneously can be designed to follow the same story, occurrence of a clock skew can be avoided.

A clock pulse circuit having a construction of multiple stories available in the prior art is designed, however, to give clock pulses to all the units which require such clock pulses, regardless some of the units really require the clock pulses during a specific period or regardless some of the units belong to a specific family or a group of units required for accomplishment of a specific function.

It is needless to emphasize that supply of clock pluses requires power consumption more or less. Insofar as a small sized clock pulse circuit is concerned, the amount of such power consumption as is employed by a system in which clock pulses are given to all the destination units, regardless of real requirement, is marginal. When it comes to large scale clock pulse circuit, it is a different story.

OBJECTS AND SUMMARY OF THE INVENTION

Accordingly, an object of this invention is to provide a clock pulse circuit having a construction of multiple stories, wherein the power consumption is less.

To achieve the foregoing object, a clock pulse circuit having a construction of multiple stories in accordance with this invention comprises:

a terminal for a clock pulse generator, a first story trunk line connected the clock pulse generator, a plurality of first story branch lines, each of which is connected the first story trunk line, a plurality of second story trunk lines each of which is connected one of the second story trunk liens, a plurality of second story branch lines, each of which is connected one of the second story trunk lines, and a plurality of combinations of higher story trunk lines and higher story branch lines, such combinations being composed of in the similar manner as is defined above, wherein a switching element is provided between selected one of the branch lines and the truck line following the selected one of the branch lines.

In the foregoing clock pulse circuit having a construction of multiple stories, the switching element can be an AND circuit which is activated by an enabling signal given by an outside units of the circuit and a clock pulse.

In the foregoing clock pulse circuit having a construction of multiple stories, wherein the switching circuit is an AND circuit which is activated by an enabling signal given by an outside units of the circuit and a clock pulse, the AND circuit can be provided a driver circuit for reforming the front edge of a given clock pulse into a sharp rising front edge.

The foregoing clock pulse circuit having a construction of multiple stories can be employed for a sequential regulation system having multiple functions.

BRIEF DESCRIPTION OF THE DRAWINGS

This invention, together with its various features and advantages, can be readily understood from the following drawings, in which.

DETAILED DESCRIPTION OF THE PREFERRED EMBODIMENTS

First Embodiment

A clock pulse circuit having a construction of multiple stories having a first story composed of one trunk line and 10 branch lines and a second story composed of 10 trunk lines and 40 branch lines, the second story being split into two groups.

Figure 1:
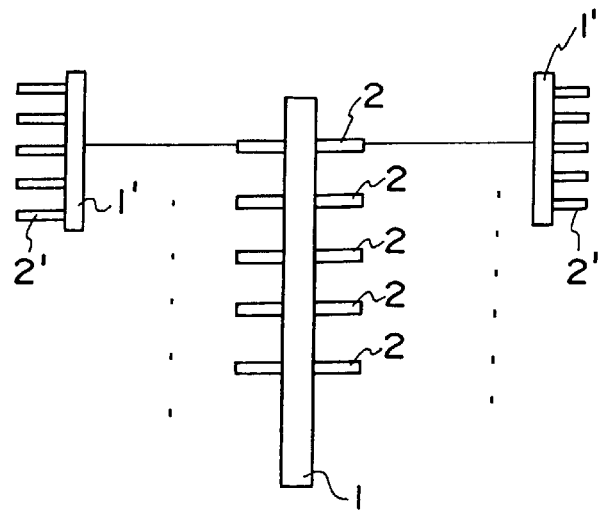
FIG. 1 is a schematic circuit diagram of a clock pulse circuit having a construction of multiple stories available in the prior art.
Figure 2:
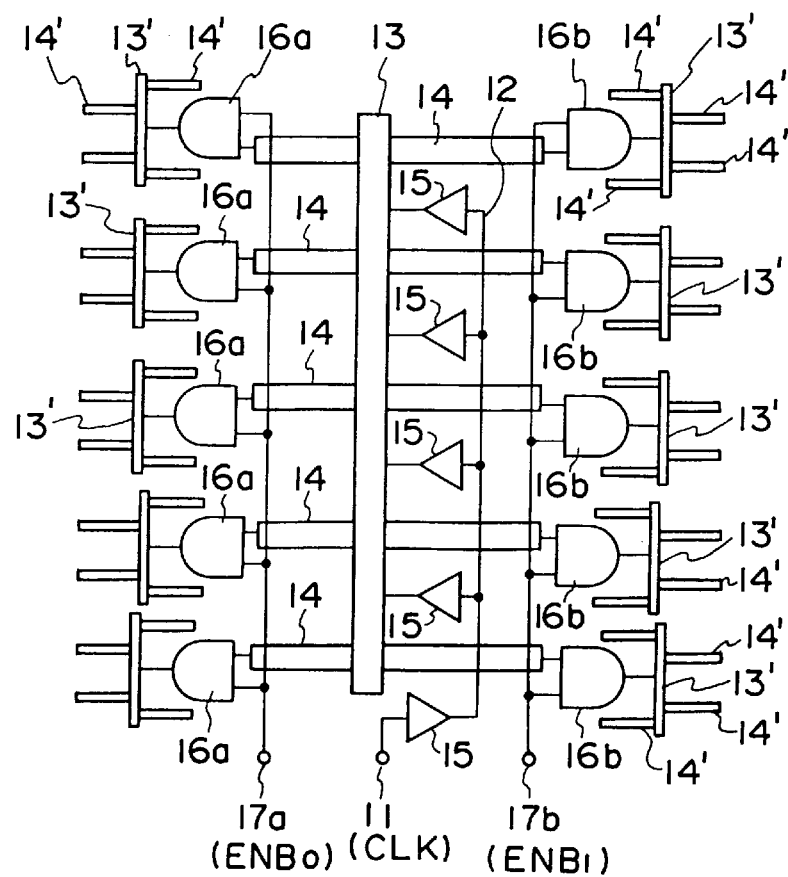
FIG. 2 is a schematic circuit diagram of a clock pulse circuit having a construction of multiple stories in accordance with the first embodiment of this invention.

Referring to FIG. 2, a clock pulse circuit having a construction of multiple stories in accordance with a first embodiment of this invention has a terminal (11) for receiving clock signals generated by a clock pulse generator (not shown), a trunk line (13) of a first story connected the clock pulse generator (not shown) via drivers (15), 10 branch lines (14) of the first story each of which is connected the trunk line (13) of the first story, ten AND circuit (16a) and (16b) each of which has an input line connected one of the branch lines (14) of the first story, the other imput line connected a terminal for an enabling signal (17a) or (17b) which is to receive enabling signals and an output line connected one of ten trunk lines (13') of a second story connected ten branch lines (14') of the second story connected the corresponding trunk line (13') of the second story. The function of the drivers (15) is to uniform the shape of the front edge of a clock pulse to make it a sharp step shape.

Each branch line (14') of the second story is connected a group of units (not shown) requiring clock pulses at a same period. Each unit (not shown) is a combination of elements (not shown) requiring clock pulses at a same period, such as a counter, a register, a memory, a ratch, a flip-flop circuit et al.

Each AND circuit (16a) or (16b) allows a clock pulse to pass therethrough, provided an enabling signal is given. In FIG. 2, all the AND circuits (16a) located on the left side of the trunk line (13) work simultaneously, provided an enabling signal is given to the terminal for receiving enabling signals (17a), and all the AND circuits (16b) located on the right side of the trunk line (13) work simultaneously, provided an enabling signal is given to the terminal for receiving enabling signals (17b). As a result, all the clock circuits of the second story located on the left side of the trunk line (13) passes clock signals simultaneously, and all the clock circuits of the second story located on the fight side of the trunk line (13) passes clock signals simultaneously.

This means that the clock circuit in accordance with the first embodiment of this invention allows selection of groups of the clock circuits of the second story which is working. In other works, clock circuits remained unselected do not use any amount of electric power to keep them on a stand-by position.

Second Embodiment

A clock pulse circuit having a construction of multiple stories having a first story composed of one trunk line and ten branch lines and a second story composed of ten trunk lines and 40 branch lines, the second story being split into two groups, wherein a first five of the second story being connected a master block and the remaining five of the second story being connected a slave block which works following a command issued by the master block.

Figure 3:
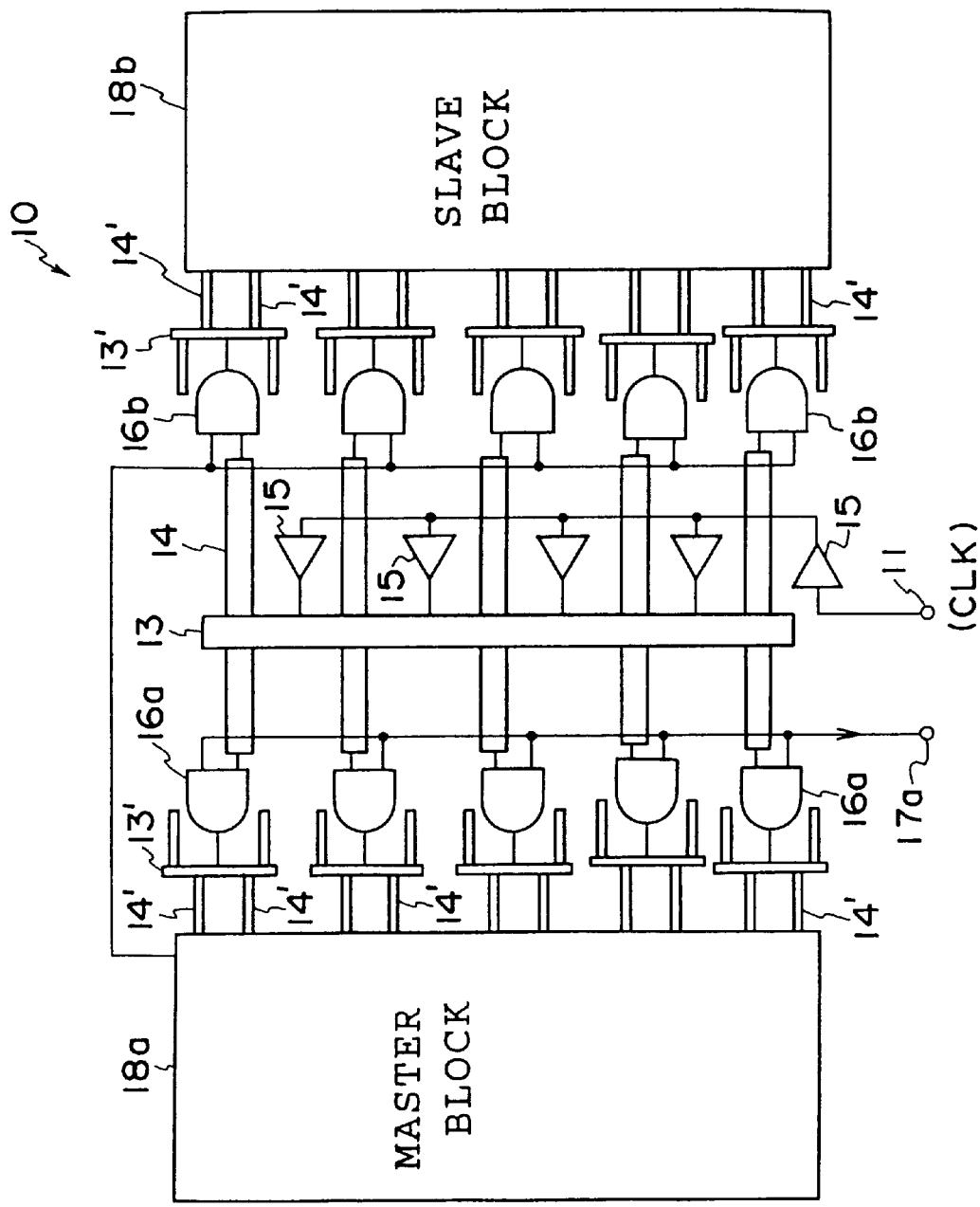
FIG. 3 is a schematic circuit diagram of a clock pulse circuit having a construction of multiple stories in accordance with the second embodiment of this invention.

Referring to FIG. 3, first five are connected a master block (18a) to supply clock pulses to the same and the remaining five are connected a slave block (18b) which are given clock pulses only when the master block (18a) so commands. An example of a combination of a master block and a slave block is a combination of a note book type personal computer and peripheral card interfaces. Albeit the master block (18a) which is a note book type personal computer in this case, permanently works, a slave block (18b) which is a plurality of peripheral card interfaces in this case, works only when a command has been issued by the master block to begin working. In this example, albeit enabling signals are permanently given to the master block as long as a personal computer is working, the AND circuits (16b) of the slave block (18b) are given enabling signals from the master block (18a).

As a result, the power consumption is reduced for the clock pulse circuit having a construction of multiple stories in accordance with the second embodiment of this invention.

Third Embodiment

A clock pulse circuit having a construction of multiple stories having a first story composed of one trunk line and ten branch lines and a second story composed of ten trunk lines and 40 branch lines, the second story being split into two groups, wherein a power administration resister is provided to administer each functional block (18) or (18') following information given by monitor signals transmitted via monitor signal transmission lines (20).

Figure 4:
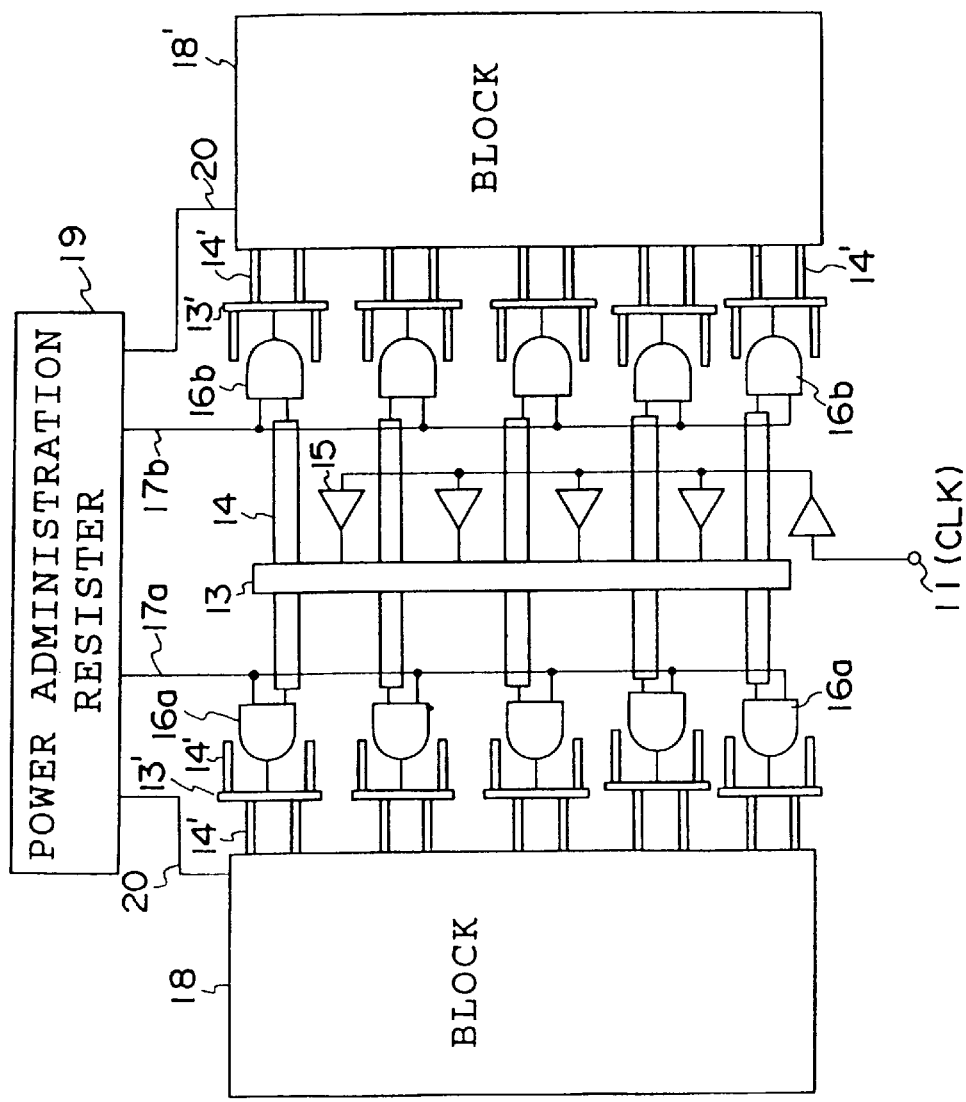
FIG. 4 is a schematic circuit diagram of a clock pulse circuit having a construction of multiple stories in accordance with the third embodiment of this invention.

Referring to FIG. 4, a power administration resister (19) is provided to administer each functional block (18) or (18') following information given by monitor signals transmitted via monitor signal transmission lines 20. The power administration resister (19) gives enabling signals via the terminals for enabling signals (17a) or the terminals for enabling signals (17b) respectively to the AND circuits (16a) of a first functional block (A) or to the AND circuits (16b) of a second functional block (B).

As a result, the power consumption is reduced for the clock pulse circuit having a construction of multiple stories in accordance with the third embodiment of this invention.

Fourth Embodiment

A clock pulse circuit having a construction of multiple stories having a first story composed of one trunk line and ten branch lines and a second story composed of ten trunk lines and 40 branch lines, the second story being split into two groups, in accordance with the third embodiment of this invention, wherein the power administration resister is a computer unit working following a computer program loaded therein.

Figure 5:
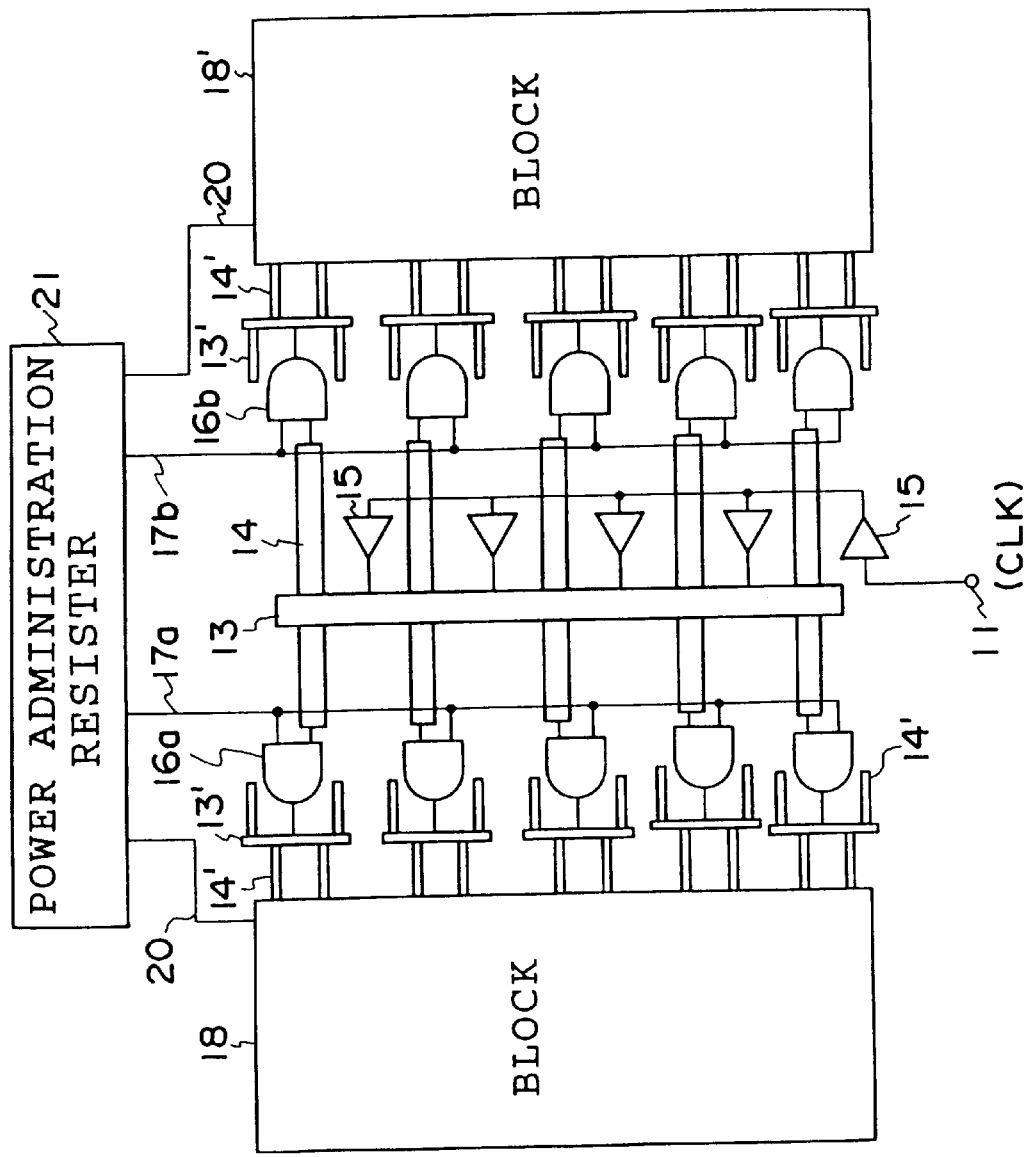
FIG. 5 is a schematic circuit diagram of a clock pulse circuit having a construction of multiple stories in accordance with the fourth embodiment of this invention.

Referring to FIG. 5, the power administration resister (21) is a computer unit working following a computer program loaded therein. Following commands issued by the program loaded in the computer unit (21), the power administration resister (21) gives enabling signals via the terminals for enabling signals (17a) or the terminals for enabling signals (17b) respectively to the AND circuits (16a) of a first functional block (A) or to the AND circuits (16b) of a second functional block (B).

As a result, the power consumption is reduced for the clock pulse circuit having a construction of multiple stories in accordance with the fourth embodiment of this invention.

Fifth Embodiment

A clock pulse circuit having a construction of multiple stories having a first story composed of one trunk line and ten branch lines and a second story composed of ten trunk lines and 40 branch lines, the second story being split into two groups, wherein a decoder (23) is provided to give enabling signals to AND circuits (16a) and (16b) via respectively a terminal for the AND circuits (16a) and (17a) and a terminal for the AND circuits (16b) and (17b) for the ultimate purposes to cause the block A (18) and the block B (18') to work.

Figure 6:
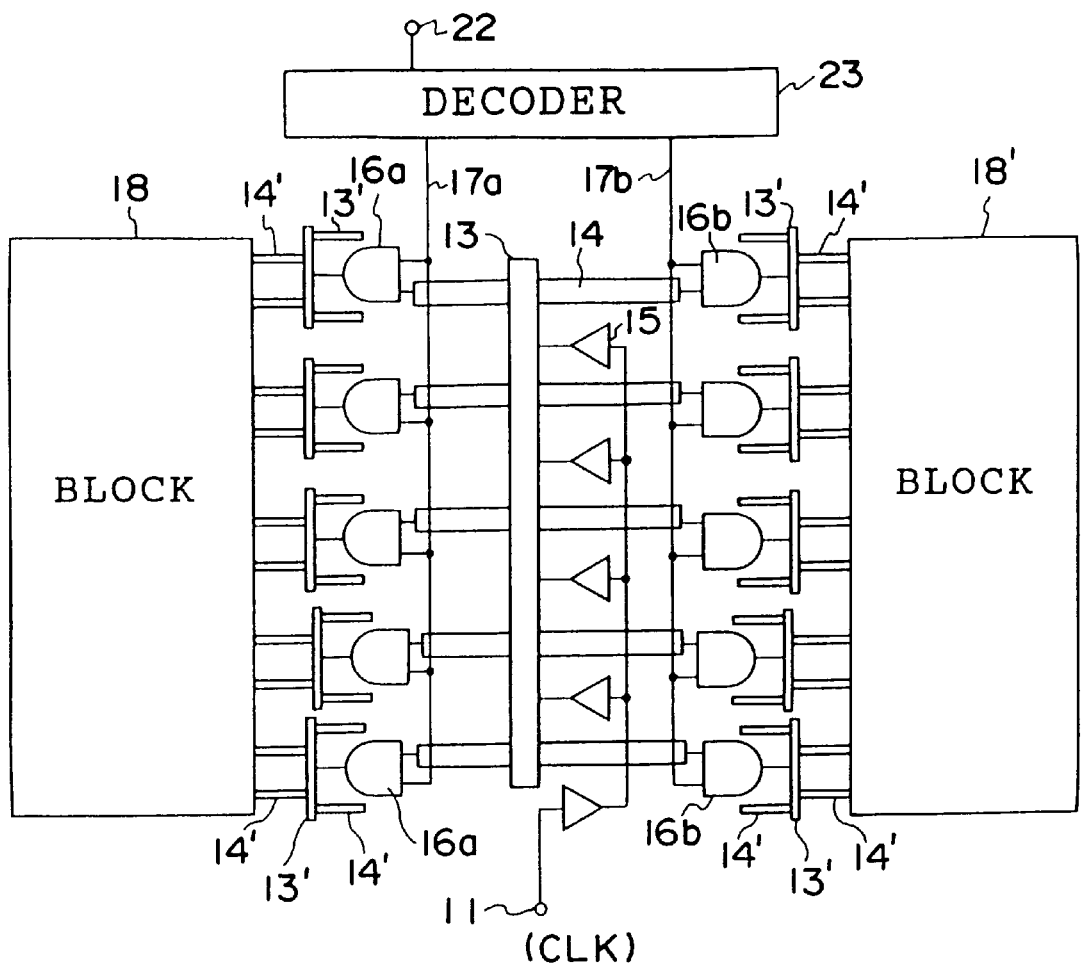
FIG. 6 is a schematic circuit diagram of a clock pulse circuit having a construction of multiple stories in accordance with the fifth embodiment of this invention.

Referring to FIG. 6, a decoder (23) receives coded signals via a terminal (22) for receiving coded signals. After decoding the coded signals, it gives commands to AND circuits (16a) and AND circuits (16b) respectively via a terminal for the AND circuits (16a) and (17a) and via a terminal for the AND circuits (16b) and (17b) to cause the block A (18) and the block B (18') to work.

As a result, the power consumption is reduced for the clock pulse circuit having a construction of multiple stories in accordance with the fifth embodiment of this invention.

MODIFICATION OF THE FIRST STORY CIRCUIT EMPLOYABLE FOR CLOCK CIRCUIT OF THIS INVENTION

An interface replaceable the first story circuit applicable to any clock pulse circuit having a construction of multiple stories having a first story composed of one trunk line and ten branch lines and a second story composed of ten trunk lines and 40 branch lines, the second story being split into two groups in accordance with this invention.

Figure 7:
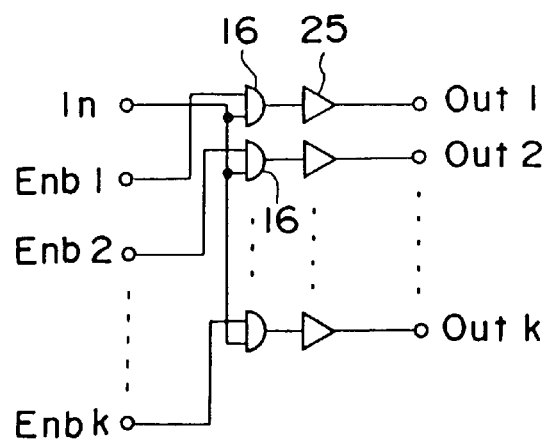
FIG. 7 is a schematic circuit diagram of an interface employable as the first story circuit employable for each clock circuit in accordance with this invention.

Referring to FIG. 7, all the AND circuits (16) have an input terminal (11) in common to receive clock signals from a clock pulse generator (not shown). Each of the AND circuits (16) has a terminal for receiving an enabling signal Enb (1) through Enb (k). The output signal of each AND circuit (16) is issued from the corresponding output terminal (Out 1) through output terminal (Out k), after being reformed the shape of the front edge of each clock pulse by a driver (25).

An application of this interface is effective to simplify the structure of the first story circuit of each clock pulse circuit having a construction of multiple stories having a first story composed of one trunk line and ten branch lines and a second story composed of ten trunk lines and 40 branch lines, the second story being split into two groups in accordance with this invention.

The foregoing description has clarified that this invention has successfully provided a clock pulse circuit having a construction of multiple stories having a first story composed of one trunk line and ten branch lines and a second story composed of ten trunk lines and 40 branch lines, the second story being split into two groups, wherein the power consumption is less.

Although this invention has been described with reference to specific embodiments, this is not meant to be construed in a limiting sense. Various modifications of the disclosed embodiments, as well as other embodiments of this invention, will be apparent to persons skilled in the art upon reference to the description of this invention. It is therefore contemplated that the appended claims will cover any such modifications or embodiments as fall within the true scope of this invention.

What is claimed is:

1. A clock circuit comprising:

a terminal which receives clock pulses from an external clock pulse generator;

a first trunk line coupled to the terminal;

a plurality of first branch lines, each of which is electrically connected to the first trunk line;

a plurality of second trunk lines, each of which is electrically connected to a corresponding one of the first branch lines;

plural sets of second branch lines, each of which is electrically connected to a corresponding one of the second trunk lines; and a plurality of switching elements, connected between the first branch lines and the second trunk lines, which selectively pass the clock pulses from the first branch lines to the second trunk lines in response to enable signals.

2. A clock circuit as claimed in claim 1, wherein each of the plurality of switching elements is an AND circuit having a first input connected to a corresponding one of the first branch lines, a second input which receives the enable signals, and an output connected to a corresponding one of the second trunk lines.

3. A clock circuit as claimed in claim 1, further comprising driver circuits which shape the clock pulses and which are connected between the terminal and the first trunk line.

4. A clock pulse circuit as claimed in claim 1, further comprising a power administration register which generates the enable signals.

5. A clock pulse circuit as claimed in claim 1, further comprising a decoder which generates the enable signals by decoding externally supplied command signals.

6. A clock pulse circuit as claimed in claim 1, further comprising a master functional block connected to a portion of the second branch lines, and a slave functional block connected to a remaining portion of the second branch lines.

7. A clock circuit comprising:

a terminal which receives clock pulses from an external clock pulse generator;

a first trunk line coupled to the terminal;

a plurality of first branch lines, each of which is electrically connected to the first trunk line;

a plurality of second trunk lines, each of which is electrically connected to a corresponding one of the first branch lines;

plural sets of second branch lines, each of which is electrically connected to a corresponding one of the second trunk lines;

a plurality of third trunk lines, each of which is electrically connected to a corresponding set of the second branch lines;

plural sets of third branch lines, each of which is electrically connected to a corresponding one of the third trunk lines; and a plurality of switching elements, connected between the first branch lines and the second trunk lines, which selectively pass the clock pulses from the first branch lines to the second trunk lines in response to enable signals.

8. A clock circuit as claimed in claim 7, wherein each of the plurality of switching elements is an AND circuit having a first input connected to a corresponding one of the first branch lines, a second input which receives the enable signals, and an output connected to a corresponding one of the second trunk lines.

9. A clock circuit as claimed in claim 7, further comprising driver circuits which shape the clock pulses and which are connected between the terminal and the first trunk line.

10. A clock pulse circuit as claimed in claim 7, further comprising a power administration register which generates the enable signals.

11. A clock pulse circuit as claimed in claim 7, further comprising a decoder which generates the enable signals by decoding externally supplied command signals.

12. A clock pulse circuit as claimed in claim 7, further comprising a master functional block connected to a portion of the third branch lines, and a slave functional block connected to a remaining portion of the third branch lines.

13. A clock circuit comprising:

a terminal which receives clock pulses from an external clock pulse generator;

a first trunk line coupled to the terminal;

a plurality of first branch lines, each of which is electrically connected to the first trunk line;

a plurality of second trunk lines, each of which is electrically connected to a corresponding one of the first branch lines;

plural sets of second branch lines, each of which is electrically connected to a corresponding one of the second trunk lines;

a plurality of third trunk lines, each of which is electrically connected to a corresponding set of the second branch lines;

plural sets of third branch lines, each of which is electrically connected to a corresponding one of the third trunk lines;

a plurality of first switching elements, connected between the first branch lines and the second trunk lines, which selectively pass the clock pulses from the first branch lines to the second trunk lines in response to enable signals; and a plurality of second switching elements, connected between the second branch lines and the third trunk lines, which selectively pass the clock pulses from the second branch lines to the third trunk lines in response to enable signals.

14. A clock circuit as claimed in claim 13, wherein each of the plurality of first switching elements is an AND circuit having a first input connected to a corresponding one of the first branch lines, a second input which receives the enable signals, and an output connected to a corresponding one of the second trunk lines.

15. A clock circuit as claimed in claim 14, further comprising driver circuits which shape the clock pulses and which are connected between the terminal and the first trunk line.

16. A clock pulse circuit as claimed in claim 13, further comprising a power administration register which generates the enable signals.

17. A clock pulse circuit as claimed in claim 13, further comprising a decoder which generates the enable signals by decoding externally supplied command signals.

18. A clock pulse circuit as claimed in claim 13, further comprising a master functional block connected to a portion of the third branch lines, and a slave functional block connected to a remaining portion of the third branch lines.

* * * * *